United States Patent [19]
Watari et al.

[11] Patent Number: 5,764,853
[45] Date of Patent: Jun. 9, 1998

[54] VOICE RECOGNITION DEVICE AND METHOD USING A (GGM) GUARANTEED GLOBAL MINIMUM MAPPING

[75] Inventors: Masao Watari, Ibaragi; Kazuo Ishii; Yasuhiko Kato, both of Kanagawa; Hiroaki Ogawa, Tokyo; Masanori Omote, Kanagawa; Kazuo Watanabe; Katsuki Minamino, both of Tokyo, all of Japan

[73] Assignee: Sony Corporation, Tokyo, Japan

[21] Appl. No.: 548,278

[22] Filed: Oct. 25, 1995

[30] Foreign Application Priority Data

Oct. 27, 1994 [JP] Japan .................. 6-263399

[51] Int. Cl.$^6$ .............. G10L 5/06; G10L 9/00; G06E 1/00; G06E 3/00
[52] U.S. Cl. ............ 395/2.52; 395/2.55; 395/2.65; 395/21
[58] Field of Search ............... 395/2.52, 2.53, 395/2.54, 2.55, 2.65, 21–24, 2.41–2.42

[56] References Cited

U.S. PATENT DOCUMENTS

| | | | |
|---|---|---|---|
| 5,175,793 | 12/1992 | Sakamoto et al. | 395/2 |
| 5,187,658 | 2/1993 | Cline et al. | 364/413.13 |
| 5,276,771 | 1/1994 | Manukian et al. | 395/24 |
| 5,481,644 | 1/1996 | Inazumi | 395/2.41 |
| 5,506,933 | 4/1996 | Nitta | 395/2.65 |
| 5,608,841 | 3/1997 | Tsuboka | 395/2.65 |

OTHER PUBLICATIONS

Kepuska et al., "Investigation of Phonemic Context in Speech Using Self–Organizing Feature Maps" ICASSP '89. pp. 504–507.
Nahamura et al., "Speaker Adaptation Applied to HMM and Neural Network", ICASSP '89, pp. 89–92.
Kepuska et al., "Phonemic Speech Recognition System Based On a Neural Network" Southeastcon, 1989, pp. 770–775.

Primary Examiner—Allen R. MacDonald
Assistant Examiner—Patrick N. Edouard
Attorney, Agent, or Firm—Limbach & Limbach LLP

[57] ABSTRACT

A voice recognition device according to the present invention including a voice analyzer for acoustically analyzing voice every predetermined frame unit to extract a feature vector X, a converter for subjecting the feature vector X output from the analyzer to a predetermined conversion process, and a voice recognizer for recognizing the voice on the basis of a new feature vector output from the converter, wherein the converter conducts the predetermined conversion processing according to a mapping F from an N-dimensional vector space $\Omega_N$ to an M-dimensional vector space $\Omega_M$, the feature vector X is a vector on the N-dimensional vector space $\Omega_N$ and the function $f_m(X)$ of an m-th component of the mapping F is represented by the following linear summation of the products of functions $g_m^k(X)$ and coefficients $c_m^k$ of $L_m$:

$$fm(X) = \sum_{k=0}^{Lm-1} c_m^k \cdot g_m^k(X)$$

Each function $g_m^k(X)$ may be set to a monomial.

26 Claims, 6 Drawing Sheets

1-FRAME FEATURE SPACE    FIG.6A

3-FRAME FEATURE SPACE    FIG.6B

5-FRAME FEATURE SPACE

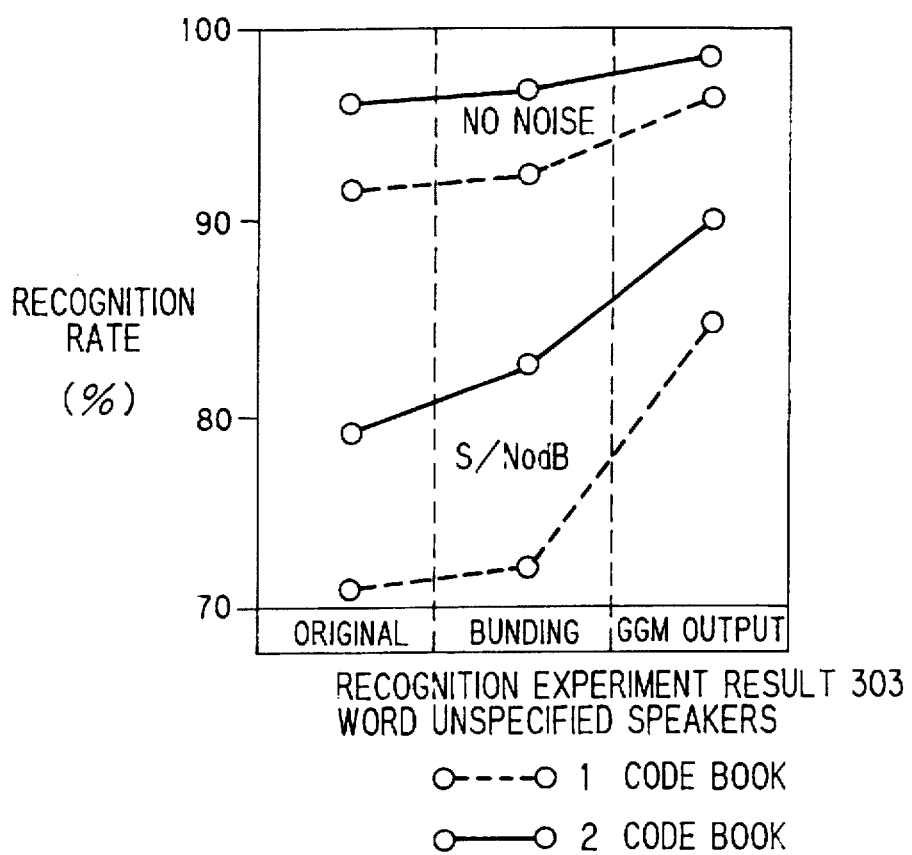

VOICE RECOGNITION DEVICE AND METHOD USING A (GGM) GUARANTEED GLOBAL MINIMUM MAPPING

BACKGROUND OF THE INVENTION

1. Field of the Invention

The present invention relates to a voice recognition device and a method for recognizing voice.

2. Description of Related Art

Conventional voice recognition devices are well known including various types of recognition devices using various recognition modes. These range from the so-called limited word recognition device, usable for specified speakers to the so-called sentence recognition device, usable for unspecified speakers. Each of these voice recognition devices is mainly comprised of a feature extraction unit for extracting a feature vector (feature amount) from voice samples and a recognition processing unit for recognizing the voice on the basis of the feature vector. However, these prior art devices use various different recognition modes.

The algorithm and construction of the recognition processing unit varies in accordance with the recognition mode, and a voice recognition device based on the HMM (Hidden Markov Model) method is a representative prior art device. Feature extraction units are well known and include a unit for passing input voice samples through a band-pass filter and then outputting rectified and smoothed output as a feature vector, or a unit for calculating LPC spectrum.

The feature vector extracted from the voice sample by the feature extraction unit is required to contain sufficient identifying information so that different phonemes can be distinguished. If the feature vector contains insufficient identification information for identifying of phonemes, it is difficult to obtain high recognition performance even though the recognition processing unit at the subsequent stage is excellent. Feature vectors obtained from the conventional feature extraction units, for plosives such as "p", "t", and "k" lack sufficient identifying information.

This problem substantially results from the use of a conventional technique in which extraction of feature vectors is performed by using a method of analyzing unstable voice signals while treating these signals as stable voice signals. Therefore, extraction of feature vectors with an analysis method using wavelet conversion or the like has been increasingly studied recently. However, existing proposed methods have not yet been sufficiently effective.

Now, considering feature vectors used in a voice recognition device with intermediate and large vocabularies, in many cases such a voice recognition device uses each phoneme as a base (category) for identification. For example, in a voice recognition device in which the recognition processing unit uses a phoneme model based on the HMM method, a phoneme model is usually obtained for each and every phoneme category. That is, an appearance probability, in which a predetermined code (symbol) is output from the phoneme model corresponding to each phoneme, and a transition probability of transition of a status constituting a phoneme model when the status outputs a code, are calculated from sample data for learning.

For example, the appearance probability is obtained by calculating a probability distribution in a feature vector space from sample data which are labeled by a phoneme signal. When the appearance probability is calculated by directly using a feature vector which is obtained by a conventional voice analyzing method, the appearance probability distributions of vowels such as "a" and "i", have little overlap with each other. However, the appearance probability distributions of the plosive consonants, as described, above are remarkably overlapped with each other between phoneme categories.

FIG. 1 is a schematic diagram showing an overlapping status of feature vector distributions of vowels "a" and "i" and plosive consonants "p" and "t" between the phoneme categories. In FIG. 1 (the same is satisfied in FIGS. 2 and 3, FIGS. 6A to 6C, FIG. 7), the feature vector space is a two-dimensional space, and a boundary between the phoneme categories on the equi-probability plane of 90%, for example, is shown.

FIG. 1 shows a category which is formed by voice data containing no noise. As shown in FIG. 1, a large overlapping occurs between the categories of the plosive consonants "p" and "t" even when no noise is present as shown in FIG. 1. That is, sharpness of separation between the plosive consonants "p" and "t" is remarkably low (in this case, only the plosive consonants "p" and "t" are considered, but the sharpness of separation between the other plosive consonants is also low).

FIG. 2 shows a category distribution of voice data containing noise. When a voice is sampled in a noisy environment, the feature vector of the voice including the noise is merely slightly deformed from that of the voice including without noise (FIG. 1) if the noise level is small. However, as the noise level increases, the deformation becomes greater and it is approximated by a feature vector obtained from just the noise.

That is, as the noise level increases, the categories of the feature vectors of the phonemes ("a", "i", "p", "t") shown in FIG. 1 are deformed toward the category which is formed by the feature vector of just the noise, as if lumps of noise categories were formed. The size of each lump increases if the noise level is higher, and many lumps are formed in plural directions if the types of noises are increased.

FIG. 2 is a schematic diagram showing the feature vector distribution of phoneme categories shown in FIG. 7 in an environment including the noise of an air conditioner. In FIG. 2, portions as indicated by dotted lines correspond to lumps which are formed by the noise of the air conditioner.

As is apparent from FIG. 2, the effect of the noise is to increase the size of the overlapping area of the categories of the plosive consonants "p" and "t" which is already large even under a noiseless environment. That is, the sharpness of separation between the phoneme categories is further deteriorated by the presence of the noise. This effect makes it difficult to perform voice recognition in a noisy environment.

In FIGS. 1 and 2, it is assumed that the distribution of each phoneme category is a simple distribution which can be represented by a normal distribution. However, the actual distribution of a phoneme category is not such a simple distribution, but a complicated distribution due to the effect of tone coupling, etc. That is, even when feature vectors are obtained from the same labelled voice data, there are instances where these feature vectors are different because the phonemes before and after these feature vectors are different therebetween. Therefore, the actual distribution is not a simple distribution which can be represented by a normal distribution.

FIG. 3 shows the actual distribution of a feature vector. As shown in FIG. 3, the feature vector for one phoneme is not distributed in a single range, but it is usually in plural ranges.

In order to handle such a complicated distribution, for example, a voice recognition device based on a continuous HMM method operates in such a manner that the appearance probability and the transition probability of phoneme models are described with a mixing distribution of normal distributions. Furthermore, a voice recognition device based on a discrete HMM method operates in such a manner as to increase the code book size of a VQ (vector quantization) code book.

However, in the voice recognition device based on the continuous HMM method, since the appearance probability and the transition probability are described with a mixing distribution of normal distributions, a memory requirements for storing coefficients used for the mixing distribution is greatly increased as compared with a case where the phoneme category is assumed to be a simple distribution as shown in FIGS. 1 and 2, and the number of calculations required for voice recognition is also increased.

Furthermore, in the voice recognition device based on the discrete HMM method, the memory requirements and the number of calculations are also increased due to the increase of the size of the VQ code book like the voice recognition device based on the continuous HMM method.

Still furthermore, in order to cover unspecified speakers, the mixing number for the mixing distribution and the size of the VQ code book are required to be increased for the voice recognition device based on the continuous HMM method and the voice recognition device based on discrete HMM method, respectively. According to these methods, their effects can be developed by learning with many data samples corresponding to the above increase. That is, in order to greatly enhance the recognition performance, the learning must be performed with a large amount of learning data samples. However, there is a limit in the amount of data samples which can be actually collected, and thus there is also a limit in the recognition performance based on a realistic number of data samples.

The foregoing description relates to a voice recognition device based on the HMM method, however, the low sharpness of separation between phonemes and the complication of the distribution in the feature vector have the same effect on other devices in which the recognition processing unit use methods other than the HMM method, for example, a DP matching system of multi-template type.

That is, the feature vector which is conventionally used has the following problems:

1) identification (separation sharpness) between phoneme categories is low; and 2) the distribution of a phoneme category is complicated. Therefore, it is difficult to greatly improve the recognition rate of voice.

SUMMARY OF THE INVENTION

An object of the present invention is to provide a voice recognition device which is capable of greatly improving both voice recognition of an unspecified speaker and recognition performance in a noisy environment by enhancing the sharpness of separation between phoneme categories and simplifying the distribution of a phoneme category.

In order to attain the above object, according to a first aspect of the present invention, a voice recognition device according to the present invention includes analyzing means for acoustically analyzing voice every predetermined frame unit to extract a feature vector X (for example, a voice analyzer 2 or the like as shown in FIG. 4), converting means for subjecting a feature vector X output from the analyzing means to a predetermined conversion process (for example, a GGM (Guaranteed Global minimum Mapping) converter 4 or the like as shown in FIG. 4), and recognition means for recognizing the voice on the basis of a new feature vector output from the conversion means (for example, a recognition processing unit 5 or the like as shown in FIG. 4), wherein the conversion means conducts the predetermined conversion processing according to a mapping F from an N-dimensional vector space $\Omega_N$ to an M-dimensional vector space $\Omega_M$, the feature vector X is a vector on the N-dimensional vector space $\Omega_N$ and the function $f_m(X)$ of an m-th component of the mapping F is represented by the following linear summation of the products of functions $g_m^k(X)$ and coefficients $c_m^k$ of $L_m$:

$$fm(X) = \sum_{k=0}^{Lm-1} c_m^k \cdot g_m^k(X)$$

In the voice recognition device as described above, each function $g_m^k(X)$ may be set to a monomial.

Furthermore, the coefficient $c_m^k$ is set so that the following estimation function J is minized:

$$J = \sum_{q=0}^{Q-1} E\{X \epsilon S_q\} \left\{ \sum_{m=0}^{M-1} (fm(X) - t_m^q)^2 \right\}$$

where $S_q (=(S_0^1, S_1^q, S_2^q, \ldots, S_{N-1}^q))$ represents a learning sample of the N-dimensional vector space $\Omega_N$ which is classified into categories Cq of Q (q=0, 1, 2, ..., Q−1), $T_q$ ($=(t_0^q, t_1^q, t_2^q, \ldots, t_{M-1}^q)$) represents teacher vectors on the M-dimensional vector space which correspond to the Q categories $C_q$, and a calculation of an expected value of the function $f_m(X)$ over all elements of the learning sample $S_q$ is set to $E\{X \epsilon S_q\}\{f(X)\}$. Furthermore, the categories $C_q$ of Q are set to correspond to Q types of phonemes, and the learning sample $S_q$ can be set as labelled voice data.

The dimension M of the vector space after conversion by the mapping F can be equal to the total number Q of the categories $C_q$ corresponding to the phonemes. Furthermore, each teacher vector $T_q$ may be set as an unit vector in the M-dimensional vector space. In addition, teacher vectors $T_q$ of Q may be set so as to be orthogonal to each other. The voice data may contain noise.

A voice recognition device according to the first aspect of the present invention further includes bundling means (for example, a feature vector bundling unit 3 as shown in FIG. 4) for bundling feature vectors X of plural frames, each of which is output every predetermined frame unit from the analyzing means, and then supplying bundled feature vectors as a feature vector X to the conversion means.

The feature vector X may be formed of LPC spectrum. Furthermore, the feature vector X may be formed of power from every predetermined band width of the voice.

The recognition means may recognize voice on the basis of both the new feature vector output from the conversion means and the feature vector X output from the analyzing means. When the analyzing means acoustically analyzes the voice and extracts the feature vector X and another feature vector which is different from the feature vector X, the recognizing means may recognize the voice on the basis of both the new feature vector output from the conversion means and the other feature vector output from the analyzing means. The other feature vector may be set to the difference between respective feature vectors X extracted from two frames which are spaced away from each other by a predetermined frame number.

The recognition means may recognize the voice according to an HMM (Hidden Markov Models) method. Furthermore, when the voice recognition device further includes vector quantization means for vector-quantizing a vector supplied to the recognition means to output a predetermined code (for example, a 41-dimensional VQ processing unit 15, 16-dimensional VQ processing unit 16 or the like), the recognition means may recognize the voice on the basis of the predetermined code output from the vector quantization means according to the discrete HMM method.

According to a second aspect of the present invention, a voice recognition method comprises a voice analyzing step for acoustically analyzing voice every predetermined frame unit to extract a feature vector X, a vector conversion step for subjecting a feature vector X extracted in the voice analyzing step to a predetermined conversion process, and a voice recognition step for recognizing the voice on the basis of the new feature vector output in the vector conversion step, wherein the predetermined conversion processing is conducted according to a mapping F from an N-dimensional vector space $\Omega_N$ to an M-dimensional vector space $\Omega_M$ in the vector conversion step, the feature vector X is a vector on the N-dimensional vector space $\Omega_N$, and the function $f_m(X)$ of an m-th component of the mapping F is represented by the following linear summation of the products of complete component functions $g_m^k(X)$ of $L_m$ determined on the basis of the distribution of the learning sample $S_q$ ($=(S_0^q, S_1^q, S_2^q, \ldots, S_{N-1}^q)$) on the N-dimensional measurable vector space which is classified into categories $C_q$ (q=0, 1, 2, ..., Q−1) of Q, and coefficients $c_m^k$ of $L_m$:

$$f_m(X) = \sum_{k=0}^{L_m-1} c_m^k \cdot g_m^k(X)$$

wherein when teacher vectors $T_q$ ($=(t_0^q, t_1^q, t_2^q, \ldots, t_{M-1}^q)$) on an M-dimensional measurable vector space $\Omega_M$ for the categories $C_q$ of Q are provided and a predetermined estimation function J is calculated, the coefficient $c_m^k$ is determined so as to minimize the estimation function J.

In the voice recognition device and method thus constructed, a feature vector X is converted to a new feature vector by a mapping F in which the function $f_m(X)$ of the m-th component is represented by the linear summation of the $L_m$ products of the functions $g_m^k(X)$ and the coefficients $c_m^k$, and the voice recognition is performed on the basis of the new feature vector. Accordingly, the feature vector X which is distributed in a complicated form is converted to the new feature vector which is distributed in a simple form, that is, the feature vector X which is distributed in plural ranges is converted to the new feature vector which is distributed in a single range, so that the voice recognition rate can be greatly improved.

Furthermore, when the feature vectors X each of which is output every predetermined frame unit are bundled by a predetermined frame number and then output as a feature vector X, the sharpness of separation between different phoneme categories can be enhanced, so that the voice recognition rate can be also greatly improved.

BRIEF DESCRIPTION OF THE DRAWINGS

FIGS. 6A to 6C are a diagram showing enhancement of the sharpness of separation between phonemes by the processing of the feature vector bundling unit 3 of FIG. 4;

FIG. 9 is a diagram showing a simulation result.

DETAILED DESCRIPTION OF THE PREFERRED EMBODIMENT

A preferred embodiment according to the present invention will be described hereunder with reference to the accompanying drawings.

Figure 4:
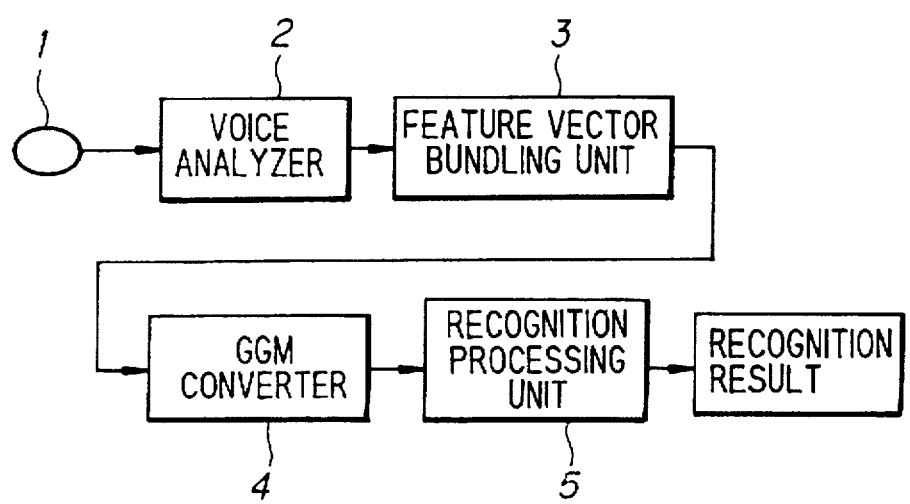
FIG. 4 is a block diagram showing the construction of an embodiment of a voice recognition device to which the present invention has been applied.

FIG. 4 shows an embodiment of a voice recognition device to which the present invention has been applied.

Upon input of voice, a microphone 1 converts the input voice to an audio signal which is an electrical signal. A voice analyzer 2 acoustically analyzes the audio signal from the microphone 1 every predetermined frame unit to extract a K-dimensional feature vector. The voice analyzer 2 performs not only the extraction of the K-dimensional feature vector, but also the extraction of other feature vectors and the detection of the voice section. The feature vectors other than the K-dimensional feature vector and the voice section are directly supplied to the recognition processing unit 5 (as described in detail later).

The feature vector bundling unit 3 bundles feature vectors of plural frames, each feature vector being output every predetermined frame unit from the voice analyzer 2, and then outputs the feature vectors thus bundled to the GGM converter 4.

The GGM converter 4 conducts a predetermined conversion process on the feature vectors supplied from the voice analyzer 2 through the feature vector bundling unit 3 according to the mapping F as described later. The recognition processing unit 5 recognizes the input voice on the basis of feature parameters supplied from the GGM conversion unit 4 and the voice analyzer 2 according to the HMM method, for example.

Next, the operation of the voice recognition device of this embodiment will be described.

Upon input of voice into the microphone 1, the voice is converted to an audio signal which is an electrical signal, and then output to the voice analyzer 2. In the voice analyzer 2, K-dimensional feature vectors are extracted every predetermined frame unit from the voice signal of the microphone 1, and then supplied to the feature vector bundling unit 3. Furthermore, in the voice analyzer 2, the feature vectors other than the K-dimensional feature vector are extracted from the voice signal, and then supplied to the recognition processing unit 5. The voice analyzer 2 detects a voice section from the voice signal and then supplies it to the recognition processing unit 5.

In the feature vector bundling unit 3, the K-dimensional feature vector of plural frames (for example, of H frames) from the voice analyzer 2 are bundled, and then output as a KXH-dimensional feature vector to the GGM converter 4. In the GGM converter 4, the predetermined conversion processing is conducted on the KXH-dimensional feature vector from the feature vector bundling unit 3 according to the mapping F, and a new J-dimensional feature vector thus formed is output to the recognition processing unit 5. In the recognition processing unit 5, the input voice is recognized on the basis of the feature parameter from the voice analyzer 2 and the feature parameter from the GGM converter 4 in the voice section supplied from the voice analyzer 2 according to the HMM method or the like, and then the recognition result is output.

Next, the details of the third processing of the feature vector bundling unit 3 will be described with reference to FIGS. 5A and 5B and FIGS. 6A to 6C.

Figure 5A:
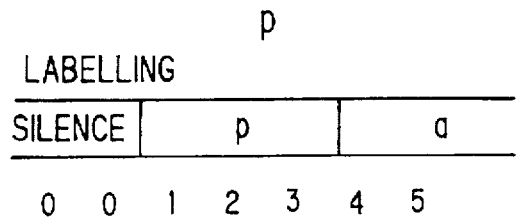
FIGS. 5A and 5B are diagrams shown the processing of a feature vector bundling unit 3 of FIG. 4.
Figure 5B:
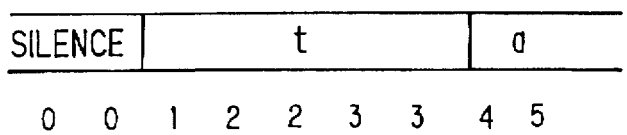
Figure 5B:
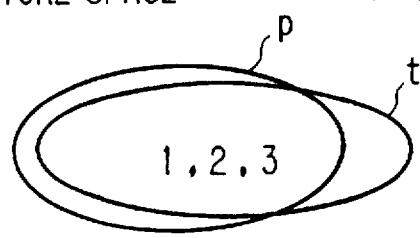
Figure 5B:
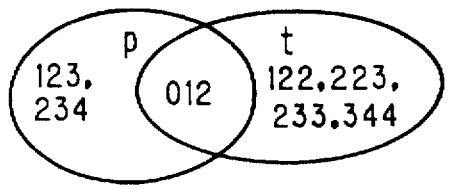

In FIGS. 5A and 5B, the feature vectors of the plosive consonants "p" and "t" are represented in time series. In these figures, the feature vector space is set to a one-dimensional space (therefore, the feature vector is not a vector quantity, but rather a scalar quantity).

FIG. 5A shows the feature vector time series when an utterance of "pa" is made from a silence (voiceless) state, in respective areas which are labelled with "silence", "p" and "a". FIG. 5B shows the feature vector time series when an utterance of "ta" is made from the silent state, in respective areas which are labelled with "silence", "t" and "a".

There are three kinds ("1", "2" and "3") of feature vectors which are obtained from frames which are labelled with "p" (subjected to the labelling) (which is a scalar quantity in this case) as shown in FIG. 5A, and also there are three kinds ("1", "2" and "3") of feature vectors which are obtained from frames labelled with "t".

Figure 1:
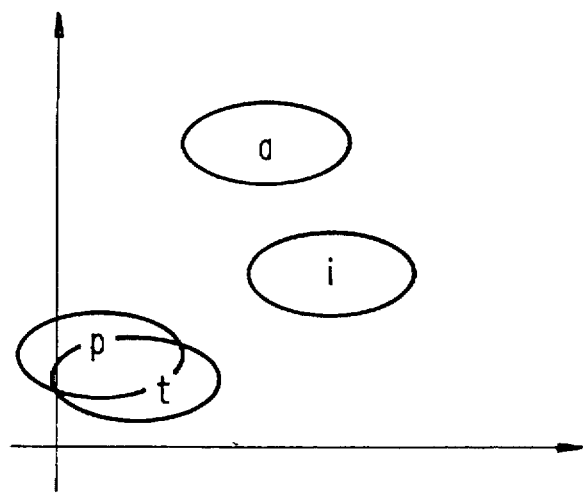
FIG. 1 is a diagram showing the distribution of a feature vector of voice data containing no noise.
Figure 2:
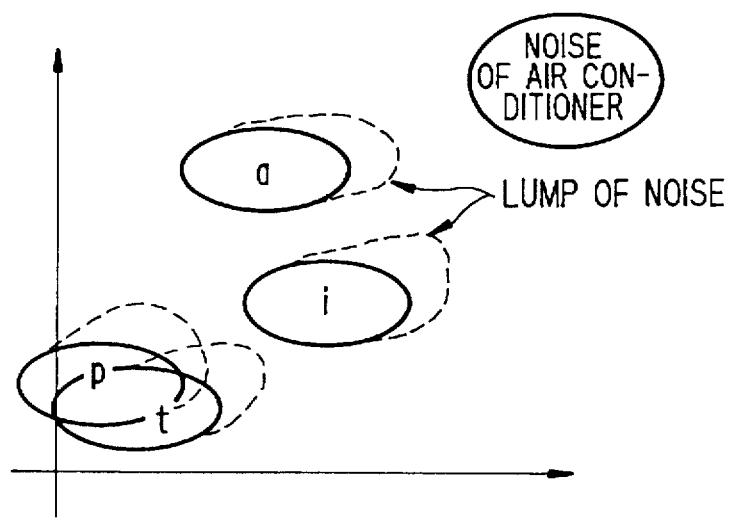
FIG. 2 is a diagram showing the distribution of a feature vector of voice data containing noise.
Figure 3:
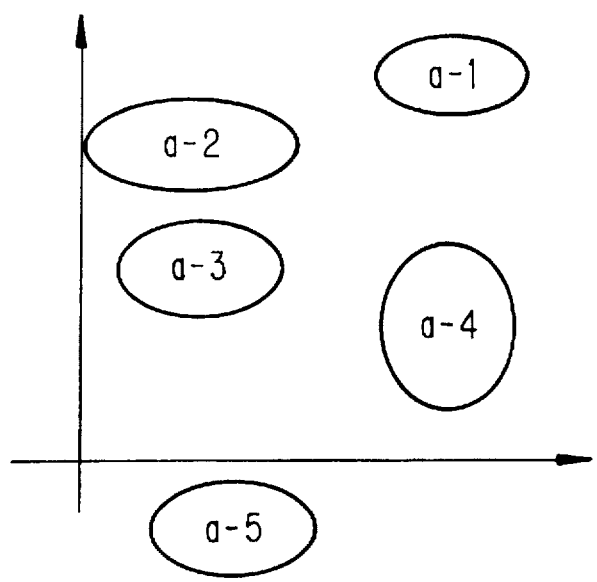
FIG. 3 is a diagram showing complication of the distribution of the feature vector.

Accordingly, the categories (areas) of so-called local feature vectors each of which is obtained from one frame labelled with a consonant "p" or "t" are perfectly overlapped with each other as shown in FIG. 6A, so that the consonants "p" and "t" are not discriminable. Actually, the feature vectors which are obtained from respective frames labelled with consonants "p", "t" are not perfectly coincident with each other, and these feature vectors are slightly different from each other. Therefore, in FIG. 3A, the categories of "p" and "t" are illustrated as being substantially overlapped with each other.

Next, feature vectors containing both neighboring frames of a labelled frame, that is, a feature vector into which the feature vector of a frame concerned and the feature vectors of both frames adjacent to the frame concerned are bundled (hereinafter referred to as "bundled feature vector") is considered. there are three kinds of bundled feature vectors "012", "123", "234" for the consonant "p". On the other hand, there are five kinds of bundled feature vectors "!012", "122", "223", "233" and "334" for the consonant "t". In this case, the overlap portion of the categories of "p" and "t" is only the area of "012" as shown in FIG. 6B, and the other portions are not overlapped with one another. Therefore, the sharpness of separation between the consonants "p" and "t" are remarkably enhanced.

Figure 6C:
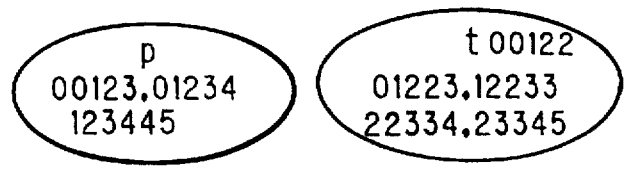

Furthermore, considering a feature vector into which the feature vector concerned and the feature vectors of two frames which are located at each of right and left sides of the feature vector concerned (i.e., in total, four feature vectors of four frames at the right and left sides of the feature vector concerned) are bundled, the categories of the bundled feature vectors of the consonants "p" and "t" are perfectly separated from each other as shown in FIG. 6C.

Accordingly, in the feature vector bundling unit 3, feature vectors of plural frames, each of which is output every frame unit from the voice analyzer 2, are bundled into a bundled feature vector, and then the bundled feature vector is output to the GGM converter 4. In this case, the categories which are formed by the feature vectors can be separated from each other, so that the recognition rate can be greatly improved.

The bundled feature vector may be formed by the feature vector concerned and the feature vectors of frames at both sides of the feature vector concerned. In this case, the number of the frames at the right side of the feature vector concerned and the number of the frames at the left side of the feature vector concerned may be equal to each other or different from each other. That is, the bundled feature vector may be formed by bundling the feature vector concerned, the feature vector of a first frame at the right side thereof (a preceding frame on a time axis) and the feature vectors of first and second frames at the left side thereof (following frames on a time axis).

Next, the details of the fourth process of the GGM converter 4 will be described. In the GGM converter 4, the conversion processing is performed according to the following mapping F.

That is, the mapping corresponds to a conversion processing of converting a vector X on an N-dimensional vector space $\Omega_N$ to a vector on an M-dimensional vector space $\Omega_M$, and the function $f_m(X)$ of th m-th component is defined as a linear summation of the products of functions $g_m^k(X)$ and predetermined coefficients $c_{mk}$ of $L_m$ according to the following equation (here, m=0, 1, 2, ..., M−1; k=0, 1, 2, ..., $L_m$−1):

$$f_m(X) = \sum_{k=0}^{L_m-1} c_m^k \cdot g_m^k(X) \quad (1)$$

A complete (perfect) function system of an N-variable function space is adopted as the function $g_m^k(X)$ for the following reason. If a complete function system of the N-variable function space is adopted as the function $g_m^k(X)$ and the number $L_m$ of the function is set to a required number, in principle, any continuous mapping can be represented by the function $g_m^k(X)$.

This means that if a hierarchical neural network does not restrict the number of neuron elements in its intermediate layer, that is, if the number of the neuron elements increases sufficiently, any continuous mapping can be represented in principle.

By selecting and setting the function $g_m^k(X)$ to a predetermined one, the coefficient $c_m^k$ can be subsequently set through learning, so that a desired function $f_m(X)$, that is, the mapping F can be obtained. Further, when the coefficient $c_m^k$ is determined, an estimation function J as defined by the following equation is introduced:

$$J = \sum_{q=0}^{Q-1} E\{X \epsilon S_q\} \left\{ \sum_{m=0}^{M-1} (f_m(X) - t_m^q)^2 \right\} \quad (2)$$

where $S_q$ (=($S_0^q, S_1^q, S_2^q, ..., S_{N-1}^q$)) represents a learning sample of the N-dimensional vector space $\Omega_N$ which is classified into categories Cq of Q (q=0, 1, 2, ..., Q−1), $T^q$ (=($t_0^q, t_1^q, t_2^q, ..., t_{M-1}^q$)) represents teacher vectors on the M-dimensional vector space which correspond to the Q categories $C_q$, and $E\{\{X \epsilon S_q\}\{\}\}$ represents calculation of an expected value of { } over all elements of the learning sample (an assembly of learning samples) $S_q$. Accordingly, the estimation function J means an ensemble average of square error between the mapping output for the learning sample and teacher vector.

Accordingly, in order to obtain a mapping in which the mapping output for the learning sample is the teacher vector, the coefficient $C_m^k$ may be calculated as to minimize the estimation function J.

Therefore, substituting equation (1) into equation (2), the following equation is obtained.

$$J = \sum_{q=0}^{Q-1} \sum_{m=0}^{M-1} \left( \sum_{i=0}^{L_m-1} \sum_{j=0}^{L_m-1} c_m{}^i c_m{}^j E\{X \in S_q\} \{g_m{}^i(X) g_m{}^j(X)\} - \right.$$

$$\left. 2 \sum_{i=0}^{L_m-1} c_m{}^i t_m{}^q E\{X \in S_q\} \{g_m{}^i(X) + (t_m{}^q)^2\} \right) \quad (3)$$

Here, assuming the following relationships, $\alpha_{ij}{}^{qm} = E\{X \in S_q\}\{g_m{}^i(X) g_m{}^j(X)\}$, and
$\beta_i{}^{qm} = E\{X \in S_q\}\{g_m{}^i(X)\}$
the equation (3) is as follows:

$$J = \qquad (3)$$

$$\sum_{q=0}^{Q-1} \sum_{m=0}^{M-1} \left( \sum_{i=0}^{L_m-1} \sum_{j=0}^{L_m-1} c_m{}^i c_m{}^j \alpha_{ij}{}^{qm} - 2 \sum_{i=0}^{L_m-1} c_m{}^i t_m{}^q \beta_i{}^{qm} + (t_m{}^q)^2 \right)$$

Furthermore, in order to calculate extremal values of the estimation function J, $\partial J/\partial c_m{}^i = 0$, and thus this equation is calculated from the equation (4) to obtain the following equation:

$$\sum_{q=0}^{Q-1} \left( \sum_{j=0}^{L_m-1} \alpha_{ij}{}^{qm} c_m{}^j - t_m{}^q \beta_i{}^{qm} \right) = 0 \quad (5)$$

Equation (5) is a linear equation system of unknown values (coefficients) $c_m{}^k$ of $L_m$ for each m.

Introducing the following equations:

$$\alpha_{ij}{}^m = \sum_{q=0}^{Q-1} \alpha_{ij}{}^{qm}$$

$$\beta_i{}^m = \sum_{q=0}^{Q-1} t_m{}^q \cdot \beta_i{}^{qm}$$

Equation (5) is changed to the following simple form (6):

$$\sum_{j=0}^{L_m-1} \alpha_{ij}{}^m \cdot c_m{}^j - \beta_i{}^m = 0 \quad (6)$$

Equation (6) (equation (5)) is a linear equation, and thus, it can be uniquely solved except for a special case where its solution is indeterminate or impossible.

This means that the coefficient $c_m{}^k$ for minimizing the estimation function J represented by equation (2) can be calculated by solving equation (6) (equation (5)). Accordingly, in this case, there is no problem that a coefficient $c_m{}^k$ with which the estimation function J is calculated is a local minimum value, except for a special case where its solution is indeterminate or impossible. This means that even when a method of steepest descend is applied to the estimation function J represented by the equation (4) in place of solving of the equation (6) (equation (5)), the solution (coefficient) $c_m{}^k$ can be uniquely calculated without being disturbed by an initial value problem.

According to the characteristic in which the solution is determined uniquely as described above, it is unnecessary to perform a repetitive leaning while altering an initial value in order to calculate a quash-optimal solution in such a neural network. Furthermore, since the mapping is represented as shown in equation (1), the number of degrees of freedom equals the value of the coefficient $c_m{}^k$ and the degree of freedom of determination of the function $g_m{}^k(X)$ (that is, there are mainly two kinds of freedom).

Therefore, considered in the same degree of scale, the potential representation capability of the mapping is higher in the case where the mapping is represented as shown in equation (1) than in the case of a neural network. This is because in the case of a neural network, if the scale is fixed, the residual degree of freedom is only the degree of freedom for the value of a coupling weight coefficient.

As described above, according to the mapping represented by the equation (1) (hereinafter referred to as "GGM (Guaranteed Global minimum Mapping), the following substantial conclusions can be made:

a) the error minimum (global minimum) is guaranteed;
b) repetitive learning is unnecessary because no initial value problem exists, and thus the speed of the learning is promoted; and
c) an improvement can be realized since there is the degree of freedom for selection of the function $g_m{}^k(X)$ such that approximation capability is higher than a neural network of the same scale when a desired mapping is determined.

The details of the GGM are described in copending U.S. patent application Ser. No. 08/365,493, assigned to the same assignee as the present invention.

In the GGM converter 4, it is assumed that N=K×H and M=J, the categories $C_q$ of Q of the N-dimensional vector space $\Omega_N$ are set to correspond to Q kinds of phonemes, and learning audio data which are subjected to the labelling for each phoneme is used as a learning sample $S_q$ which is classified for each category $C_q$. Furthermore, the categories $C_q$ of Q are set as teacher vectors $T^q$ of Q which correspond to the categories of Q, and the conversion is performed according to the mapping F (equation (1)) using the coefficient $c_m{}^k$ which is obtained through the learning using base vectors in the M-dimensional vector space $\Omega_M$ (M-dimensional unit vectors which are orthogonal to each other).

Figure 7:
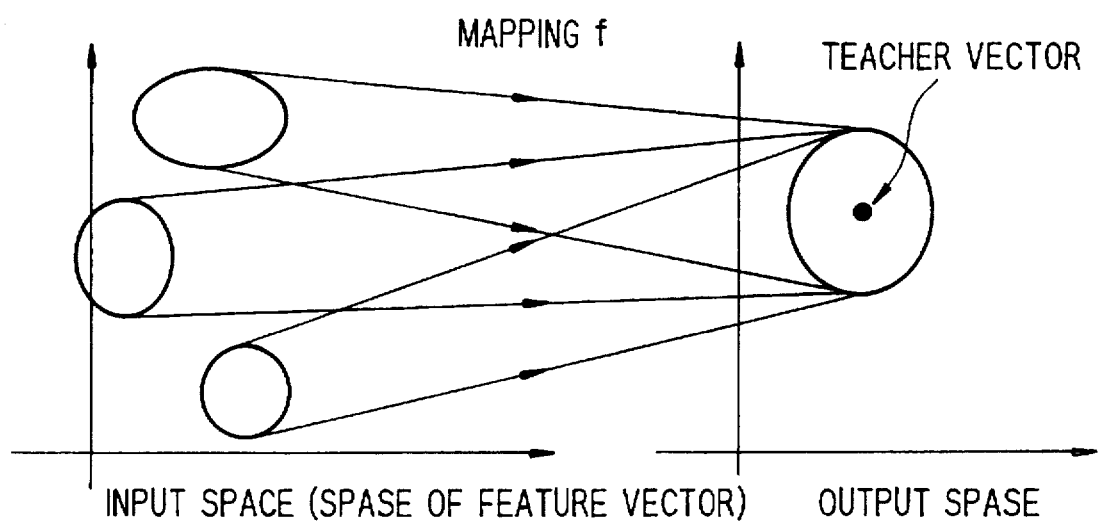
FIG. 7 is a diagram showing the processing of a GGM converter 4 of FIG. 4.

Accordingly, according to the GGM converter 4, as shown in FIG. 7, it is not necessarily a single link in the N-dimensional vector space $\Omega_N$ which is an input space, and each complicated category (each category which may be complicated) is converted to a simple category which is assembled around a teacher vector.

In this case, since the base vectors of M in the M-dimensional vector space $\upsilon_M$ are used as the teacher vectors $T_q$ of Q, the dimension order M of the feature vector (mapping output) output from the GGM converter 4 is equal to the number Q of the categories. Furthermore, since the Q kinds of phonemes correspond to the teacher vectors $T_q$ of Q, that is, the respective base vectors of M (=Q), the judgment of the phoneme can be performed by merely checking which element (component) is larger in the M (=Q)-dimensional vector elements which are mapping outputs.

The determination of the mapping as described above can be also performed by the conventional neural network. However, there is a problem in that an effective mapping cannot be determined, for example, because the error minimum cannot be guaranteed as described above. However, according to the GGM, the error minimum is guaranteed, and thus the category can be converted to a more preferable form (simple form). That is, the distribution shape of the category can be extremely simplified, so that the recognition performance can be improved greatly.

Figure 8:
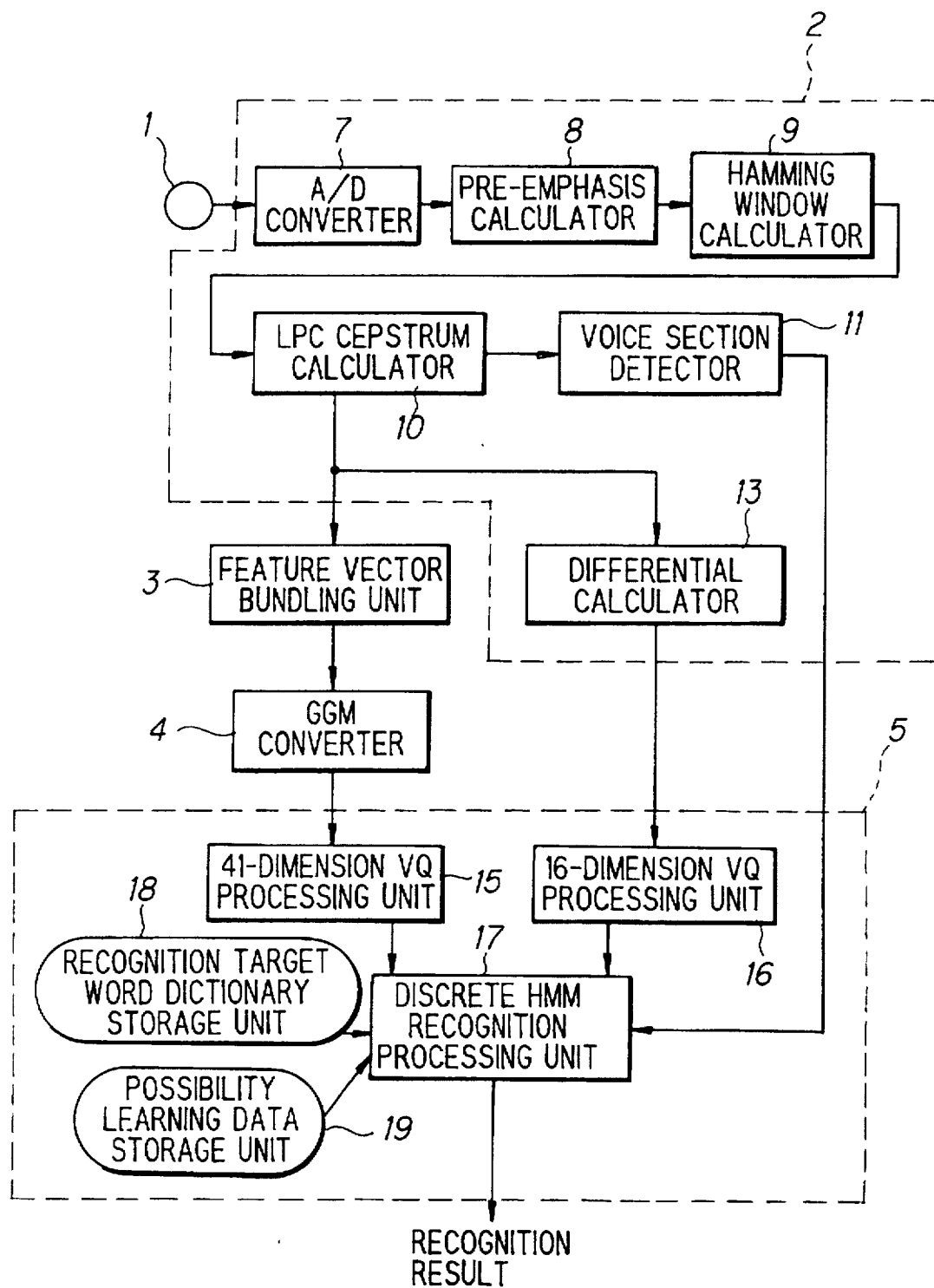
FIG. 8 is a block diagram showing the detailed construction of the embodiment of FIG. 4.

Next, FIG. 8 is a block diagram showing a more detailed construction of the voice recognition device shown in FIG. 4. In FIG. 8, the voice analyzer 2 comprises an A/D converter 7, a pre-emphasis calculator 8, a hamming window calculator 9, an LPC spectrum calculator 10, a voice section detector 11 and a differential calculator 13. The recognition processing unit 5 comprises a 41-dimensional VQ processing unit 15, a 16-dimensional VQ processing unit, a discrete HMM recognition processing unit 17, a recognition target word dictionary storage unit 18 and a probability learning data storage unit 19.

Voice, which is input to the microphone 1, is converted to an audio signal, and then output to the A/D converter. In the A/D converter 7, the audio signal is sampled at a predetermined sampling frequency (for example, at 12 kHz or the like), and then supplied to the pre-emphasis calculator 8. In the pre-emphasis calculator 8, the audio signal from the A/D converter 7 is subjected to pre-emphasis (for example, passed through a filter having a transfer function of $H(z)=1-0.97z^{-1}$, for example), and then output to the hamming window calculator 9.

In the hamming window calculator 9, for example, hamming windows of 256 are applied to the audio signal output from the pre-emphasis calculator 8. With this operation, the audio signal is cut out every 256-sample points, and supplied to the LPC spectrum calculator 10 every cut-out unit, that is, every frame unit. The cut-out operation is carried out at a predetermined frame period (for example, every 128 points). That is, the audio signal is cut out while the hamming windows of 256 points are displaced every 128 points. In place of the hamming window, other functions such as a Hanning window, a Bartlett window, etc. may be used to cut out the audio signal.

In the LPC spectrum analyzer 10, for example, a 16-order LPC spectrum coefficient is calculated as a feature vector X from the audio signal of the frame unit which is supplied from the hamming window calculator 9. That is, the LPC spectrum coefficient $c_i(n)$ is calculated from the audio signal of n-th frame (i=0, 1, 2, . . . , 16). Furthermore, the LPC spectrum calculator 10 contains a filter bank, and the audio signal is filtered with the filter bank to calculate a power p(n) every predetermined band width.

The LPC spectrum coefficient is output to the feature vector bundling unit 3 and the differential calculator 13, and the power p(n) is output to the voice section detector 1.

The power p(n) of each predetermined band width which is obtained by filtering the audio signal with the filter bank which may be output as the feature vector X to the feature vector bundling unit 3 and the differential calculator 13. That is, the LPC spectrum calculator 10 may be designed to extract a feature amount other than the LPC cepstrum coefficient from the audio signal and output it as the feature vector.

In the voice section detector 11, the voice section is detected on the basis of the power from the LPC spectrum calculator 10, and output to the discrete HMM recognition processing unit 17. Furthermore, in the differential calculator 13, the differential LPC spectrum-coefficient is calculated on the basis of the LPC spectrum coefficient. That is, in the differential calculator 13, the difference between the LPC spectrum coefficients in two frames which are located away from each other by a predetermined frame number (for example, two adjacent frames) is calculated, and the calculation result (hereinafter referred to as "differential LPC spectrum efficient") is output to the 16-dimensional VQ processing unit 16 as another feature vector which is different from the LPC cepstrum coefficient output to the feature vector bundling unit 3.

On the other hand, in the feature vector bundling unit 3, the LPC spectrum coefficients of three frames are bundled into a 48-order (=16-order×3 frames) bundled feature vector, and then output to the GGM converter 4. In the GGM converter 4, the 48-order bundled feature vector is converted to a 41-order vector (hereinafter referred to "GGM vector") according to the above mapping F which has already been obtained through the learning (hereinafter referred to as "GGM conversion"), and then output to the 41-dimensional VQ processing unit 15.

In the 41-dimensional VQ processing unit 15, the 41-order GGM vector is subjected to vector quantization to be encoded to any one of 512 kinds of codes (VQ code), for example. Likewise, in the 16-dimensional VQ processing unit 16, the 16-order feature vector (differential LPC spectrum coefficient) from the differential calculator 13 is subjected to vector quantization, and encoded to any one of 512 kinds of codes (VQ code), for example. The code book (VQ code book) which has been previously obtained through the learning are stored in the 41-dimensional VQ processing unit 15 and the 16-dimensional VQ processing unit 16, and the VQ code is output by referring to the code book.

These two kinds of VQ codes are supplied to the discrete HMM recognition processing unit 17. The discrete HMM recognition processing unit 17 performs the voice recognition processing based on, for example, the discrete HMM method, within the voice section supplied from the voice section detector 11 on the basis of the VQ codes output from the 41-dimensional VQ processing unit 15 and the 16-dimensional VQ processing unit 16 by referring to the recognition target word dictionary storage unit 18 and the probability learning data storage unit 19, and then outputs the recognition result.

That is, in the recognition target word dictionary storage unit 18, there are stored vocabularies serving as voice recognition targets, and in the probability learning data storage unit 19 are stored the appearance probability and the transition probability of each phoneme which have been obtained through the learning (learning of HMM). In the discrete HMM recognition processing unit 17, the likelihood (probability) that the VQ code series which are supplied time-sequentially is observed is calculated using the appearance probability and the transition probability. The vocabulary for which the calculation likelihood is highest in all vocabulary stored in the recognition target word dictionary storage unit 18 is output as a voice recognition result.

The discrete HMM recognition processing unit 17 may be designed to perform the recognition processing without the VQ code obtained from the differential LPC spectrum coefficient, but with only the VQ code obtained from the GGM vector. Furthermore, the discrete HMM recognition processing unit 17 may be designed to perform the voice recognition processing according to an algorithm other than the discrete HMM method.

Table 1 shows a simulation result when N=49, M=Q=41, monomials of five-order and less are adopted as the functions $g_m^k$, and the number of terms of the function $f_m(X)$ is set to satisfy $L_m$=301 for all of m, and FIG. 9 shows a graph of the simulation result of table 1.

TABLE 1

|  |  | ORIGINAL | BUNDLING | GGM OUTPUT |
|---|---|---|---|---|
| NO NOISE | 1 CODE BOOK | 92.0% | 92.7% | 96.22% |
|  | 2 CODE BOOK | 96.4% | 96.5% | 97.57% |
| NOISE PRESENT | 1 CODE BOOK | 71.8% | 72.1% | 84.4% |
|  | 2 CODE BOOK | 79.1% | 81.6% | 87.7% |

In the table 1 and FIG. 9, "ORIGINAL" shows a case where neither the bundling of the feature vectors by the feature vector bundling unit 3 nor the conversion (GGM conversion) of the feature vectors by the GGM converter 4 are performed, and "BUNDLING" shows a case where no GGM conversion of the feature vectors by the GGM converter 4 is performed, but the bundling of the feature vectors by the feature vector bundling unit 3 is carried out. Furthermore, "GGM OUTPUT" shows a case where both the bundling of the feature vectors by the feature vector bundling unit 3 and the GGM conversion of the feature vectors by the GGM converter unit 4 are carried out.

"NO NOISE" shows a voice recognition result when audio data containing no noise are recognized, and "NOISE PRESENT" (which is illustrated as "S/N0dB" in FIG. 9) shows a recognition result when noise-present audio data having S/N of 0 dB are recognized. "1 CODE BOOK" shows a case where the voice recognition is carried out using only the output of the 41-dimensional VQ processing unit 15 (as shown by a dotted line in FIG. 9), and "2 CODE BOOK" shows a case where the voice recognition is carried out using both the outputs of the 41-dimensional VQ processing unit 15 and the 16-dimensional VQ processing unit 16 (as shown by a solid line in FIG. 9). The 241-st term of the $L_m=301$ terms constituting the function $f_m(X)$ is set to a term whose order is equal to any one of 1-order to 5-order and which comprises a constant term 1 and an input variable (feature vector X). Furthermore, for the residual 60 terms, a correlation matrix is calculated using the learning audio data every phoneme category of Q=41 kinds, and a monomial containing cross terms on the variable which has strong correlation is preferentially selected. As voice data for learning (voice samples) are used respective 216 ATR (Automatic Translation Telephone Research) phonemic balance (each of 41 phonemes appears at least once) words of twenty men and twenty women (i.e., totalling 216×(20+20) =8640 words), and respective 303 phonemic balance words of ten men and ten women (Sony phonemic balance words, totally 303×(10+10)=6060 words) which are collected by the inventor of this application. The respective 216 ATR phonemic balance words of fifteen men and fifteen women (totalling, 216×(15+15)=6480 words) and the respective 303 Sony phonemic balance words of five men and five women (totalling, 303×(5+5)=3030 words) are used as non-noise learning data (learning voice data containing no noise), and all the residual words are used as non-noise test data (simulation (recognition test) voice data containing no noise).

Voice data under noise (learning and simulation voice data containing noises) are prepared as follows. Those portions which are noise data under running on the highway of Electrical Machine Promotion Associate and are recognized as containing little non-stable noise are cut out at 100 positions at an interval of 5 seconds, and these 100 kinds of noise voice data are successively superposed over the non-noise data (non-noise learning data and non-noise test data) so that S/N is equal to 0 dB. The learning of HMM is performed by learning all the noise present and under-noise learning data in a mixing state.

The VQ code book is prepared with words which are obtained by displacing the words of mode 10 every speaker. That is, the VQ code book is prepared using a first word, an eleventh word, a twenty-first word, . . . in words which are uttered by a first speaker, a second word, a twelfth word, a twenty-second word, . . . in words which are uttered by a second speaker, a third word, a thirteenth word, a twenty-third word, . . . in words which are uttered by a third speaker, etc. (data of one-tenth of the entire voice data used for the learning of HMM when the VQ code book is prepared).

From the table 1 and FIG. 9, the recognition performance is improved by the bundling of the feature vectors, and the also it is further improved by the GGM conversion.

In this embodiment, the dimension number M of the GGM vector which is obtained through the GGM conversion is set to be equal to the phonemic category number Q, however, the dimension number M and the phonemic category number Q may be different from each other.

In this embodiment, the teacher vector is set as the base vector in the M-dimensional vector space $\Omega_M$ after the GGM conversion, however, the teacher vector may be determined irrespective of the dimension number of the vector space after the GGM conversion.

Furthermore, in this embodiment, the categories $C_q$ of Q in the N-dimensional vector space $\Omega_N$ are set to correspond to the Q kinds of phonemes so that one phoneme corresponds to one teacher vector. In place of this setting, for example, it may be set so that one teacher vector corresponds to plural phonemes or plural teacher vectors correspond to one phoneme.

Still furthermore, table 1 and FIG. 9 show no case where the bundling of the feature vectors is not carried out, and only the GGM conversion is carried out, and in this case it is also confirmed that the recognition performance can be improved.

As described above, according to the voice recognition of the present invention, a feature vector X which is distributed in a complicated form is converted to a simple-distributed new feature vector, so that the voice recognition rate can be greatly improved.

Furthermore, when the feature vectors X of plural frames are bundled as a feature vector, each feature vector being output every predetermined frame unit, different phonemic categories can be separated from one another, so that the voice recognition rate can be enhanced sharply.

What is claimed is:

1. A voice recognition device comprising:

analyzing means for acoustically analyzing voice every predetermined frame unit to extract a feature vector X;

converting means for subjecting the feature vector X output from said analyzing means to a predetermined conversion process; and recognition means for recognizing the voice on the basis of a new feature vector output from said conversion means, wherein said conversion means conducts the predetermined conversion processing according to a mapping F from an N-dimensional vector space $\Omega_N$ to an M-dimensional vector space $\Omega_M$, the feature vector X is a vector on the N-dimensional vector space $\Omega_N$, and the function $f_m(X)$ of an mth component of the mapping F is represented by the following linear summation of the products of complete component functions $g_m^k(X)$ of $L_m$ determined on the basis of the distribution of the learning sample $S_q$ $(=(S_0^q, S_1^q, S_2^q, \ldots, S_{N-1}^q))$ on the N-dimensional measurable vector space which is classified into categories $C^q$ (q=0, 1, 2, . . . , Q−1) of Q, and coefficients $c_m^k$ of $L_m$:

$$f_m(X) = \sum_{k=0}^{L_m-1} c_m^k \cdot g_m^k(X)$$

wherein when teacher vectors $T_q$ $(=(t_0^q, t_1^q, t_2^q, \ldots, t_{M-1}^q))$ on an M-dimensional measurable vector space $\Omega_M$ for the categories $C_q$ of Q are provided and a predetermined estimation function J is calculated, the coefficient $c_m^k$ is determined so as to minimize the estimation function J.

2. The voice recognition device as claimed in claim 1, wherein when a calculation of an expected value of the function $f_m(X)$ over all the elements of the learning sample $S_q$ is represented by $E\{X \epsilon S_q\}\{f(X)\}$, the estimation function J is represented as follows:

$$J = \sum_{q=0}^{Q-1} E\{X \epsilon S_q\} \cdot \left\{ \sum_{m=0}^{M-1} (fm(X) - t_m^q)^2 \right\}$$

the categories $C_q$ of Q correspond to Q types of phonemes, and the learning sample $S_q$ correspond to labelled voice data.

3. The voice recognition device as claimed in claim 2, wherein each function $g_m^k(X)$ is set to a monomial.

4. The voice recognition device as claimed in claim 2, wherein the dimension M of the vector space after the conversion by the mapping F is equal to the total number Q of the categories $C_q$ corresponding to the phonemes.

5. The voice recognition device as claimed in claim 2, wherein each of the teacher vectors $T_q$ is an unit vector in the M-dimensional vector space, and the teacher vectors $T_q$ of Q are orthogonal to each other.

6. The voice recognition device as claimed in claim 2, further including bundling means for bundling feature vectors X of plural frames, each of which is output every predetermined frame unit from said analyzing means, and then supplying bundled feature vectors as a feature vector X to said conversion means.

7. The voice recognition device as claimed in claim 2, wherein the feature vector X comprises LPC spectrum.

8. The voice recognition device as claimed in claim 2, wherein the feature vector X comprises power every predetermined band width of voice.

9. The voice recognition device as claimed in claim 2, wherein said recognition means recognizes voice on the basis of both the new feature vector output from said converting means and said feature vector X output from said analyzing means.

10. The voice recognition device as claimed in claim 2, wherein said analyzing means acoustically analyzes the voice and extracts the feature vector X and another feature vector which is different from the feature vector X, and said recognizing means recognizes the voice on the basis of both the new feature vector output from said conversion means and the other feature vector output from said analyzing means.

11. The voice recognition device as claimed in claim 10, wherein the other feature vector is set to the difference between respective feature vectors X extracted from two frames which are spaced away from each other by a predetermined frame number.

12. The voice recognition device as claimed in claim 2, wherein said recognition means recognizes the voice according to an HMM (Hidden Markov Models) method.

13. The voice recognition device as claimed in claim 12, further including vector quantization means for vector-quantizing a vector supplied to said recognition means to output a predetermined code, wherein said recognition means recognizes the voice on the basis of the predetermined code output from said vector quantization means according to the discrete HMM method.

14. A voice recognition method comprising:
a voice analyzing step for acoustically analyzing voice every predetermined frame unit to extract a feature vector X;
a vector conversion step for subjecting the feature vector X extracted in said analyzing step to a predetermined conversion process; and
a voice recognition step for recognizing the voice on the basis of the new feature vector output in said vector conversion step, wherein the predetermined conversion processing is conducted according to a mapping F from an Ndimensional vector space $\Omega_N$ to an M-dimensional vector space $\Omega_M$ in said vector conversion step, the feature vector X is a vector on the N-dimensional vector space $\Omega_N$, and the function $f_m(X)$ of an m-th component of the mapping F is represented by the following linear summation of the products of complete component functions $g_m^k(X)$ of $L_m$ determined on the basis of the distribution of the learning sample $S_q$ $(=(S_0^q, S_1^q, S_2^q, \ldots, S_{N-1}^q))$ on the N-dimensional measurable vector space which is classified into categories $C_q$ (q=0, 1, 2, ..., Q-1) of Q, and coefficients $c_m^k$ of $L_m$:

$$f_m(X) = \sum_{k=0}^{L_m-1} c_m^k \cdot g_m^k(X)$$

wherein when teacher vectors $T_q$ $(=(t_0^q, t_1^q, t_2^q, \ldots, t_{M-1}^q))$ on an M-dimensional measurable vector space gm for the categories $C_q$ of Q are provided and a predetermined estimation function J is calculated, the coefficient $C_m^k$ is determined so as to minimize the estimation function J.

15. The voice recognition method as claimed in claim 14, wherein when a calculation of an expected value of the function $f_m(X)$ over all the elements of the learning sample $S_q$ is represented by $E\{X \epsilon S_q\}\{f(X)\}$, the estimation function J is represented as follows:

$$J = \sum_{q=0}^{Q-1} E\{X \epsilon S_q\} \cdot \left\{ \sum_{m=0}^{M-1} (fm(X) - t_m^q)^2 \right\}$$

the categories $C_q$ of Q correspond to Q types of phonemes, and the learning sample $S_q$ correspond to labelled voice data.

16. The voice recognition method as claimed in claim 15, wherein each function $g_m^k(X)$ is set to a monomial.

17. The voice recognition method as claimed in claim 15, wherein the dimension M of the vector space after the conversion by the mapping F is equal to the total number Q of the categories $C_q$ corresponding to the phonemes.

18. The voice recognition method as claimed in claim 15, wherein each of the teacher vectors $T_q$ is an unit vector in the M-dimensional vector space, and the teacher vectors $T_q$ of Q are orthogonal to each other.

19. The voice recognition method as claimed in claim 15, further comprising a bundling step for bundling feature vectors X of plural frames, each of which is output every predetermined frame unit in said voice analyzing step, and then supplying bundled feature vectors as a feature vector X to said conversion means.

20. The voice recognition method as claimed in claim 15, wherein the feature vector X comprises LPC spectrum.

21. The voice recognition method as claimed in claim 15, wherein the feature vector X comprises power every predetermined band width of voice.

22. The voice recognition method as claimed in claim 15, wherein in said voice recognition step, voice is recognized on the basis of both the new feature vector output from said conversion step and said feature vector X output from said voice analyzing step.

23. The voice recognition method as claimed in claim 15, wherein in said voice analyzing step, the voice is acoustically analyzed to extract the feature vector X and another feature vector which is different from the feature vector X, and in said voice recognizing step the voice is recognized on the basis of both the new feature vector output from said conversion step and the other feature vector output from said voice analyzing step.

24. The voice recognition method as claimed in claim 23, wherein the other feature vector is set to the difference between respective feature vectors X extracted from two frames which are spaced away from each other by a predetermined frame number.

25. The voice recognition method as claimed in claim 15, wherein in said recognition the voice is recognized according to an HMM (Hidden Markov Models) method.

26. The voice recognition method as claimed in claim 25, wherein said voice recognizing step includes a vector quantization step for vector-quantizing the supplied vector to output a predetermined code, the voice being recognized on the basis of the predetermined code output from said vector quantization step according to the discrete HMM method.

* * * * *